United States Patent [19]
Hughes

[11] 3,871,664
[45] Mar. 18, 1975

[54] PHONOGRAPH STYLUS

[75] Inventor: George F. Hughes, Williston Park, N.Y.

[73] Assignee: Diamagnetics, Inc., Freeport, N.Y.

[22] Filed: May 29, 1973

[21] Appl. No.: 364,829

[52] U.S. Cl. .................... 274/38
[51] Int. Cl. .................... G11b 3/44
[58] Field of Search .................... 274/38; 76/DIG. 12; 51/229; 125/39

[56] References Cited

UNITED STATES PATENTS

| | | | |
|---|---|---|---|
| 2,554,901 | 5/1951 | Fromholt | 125/39 |
| 3,184,242 | 5/1965 | Marcucci et al. | 274/38 |
| 3,774,918 | 11/1973 | Shibata | 274/38 |

*Primary Examiner*—Richard E. Aegerter
*Assistant Examiner*—Charles E. Phillips
*Attorney, Agent, or Firm*—Kane, Dalsimer, Kane, Sullivan and Kurucz

[57] ABSTRACT

An improved phonograph stylus is provided for use with a transducer for transposing mechanical variations on the opposed walls of a groove of a phonograph record into electrical signals. The stylus comprises an elongated jewel having a mounting portion at one end and an active portion tapering to a tip opposite the one end. The tip is formed by the intersection of four convex faces disposed about the jewel. The surface along which the stylus contacts one wall of the record groove comprises the curve defined by the intersection of two of the faces and the surface along which the stylus contacts the other wall is the curve defined by the intersection of the other two faces.

4 Claims, 5 Drawing Figures

PHONOGRAPH STYLUS

BACKGROUND OF THE INVENTION

The present invention relates to improvements in styli for phonograph cartridges and more particularly to a stylus particularly well adapted for use with discrete four channel record discs as well as conventional stereo and monaural discs.

Phonograph cartridges serve to convert the variations on the walls of the grooves of a phonograph record into electrical signals. To this end, the cartridge includes a stylus, usually in the form of a diamond or saphire which rides in the record groove and moves in response to variations in the groove. The stylus, in turn, is generally mounted to an armature which moves with the stylus to induce variations in an electrical or magnetic field in response to the stylus movement. This generates an electrical signal representative of the groove configuration which may then be amplified and used to drive speakers to produce an audible reproduction of the sounds recorded on the disc. In effect, the stylus is caused to mechanically vibrate in response to the variations in amplitude and frequency of the undulations of the record wall which comprises the recorded signal.

Heretofore, prior to the introduction of discrete four channel record systems, styli had to faithfully track grooves with recorded signals on the order of between 15–20 and 20,000 Hz. To this end, various conical and elliptical configurations for the styli were perfected which are capable of faithfully following the record groove contours and reproducing recorded monaural and stereophonic signals within this frequency range. Recently, however, the so called quadrasonic or discrete four channel record systems were introduced. In these quadrasonic systems, in addition to the normal stereophonic channels, two additional channels are provided on 30,000 Hz frequency modulated carriers. Thus, to reproduce the four discrete channels, it is necessary for a stylus to faithfully track the groove to cause vibrations of up to 50,000 Hz.

As the stylus rides in the record groove, the relatively hard stylus tends to wear away the relatively soft plastic of the record forming the groove. At the same time, the stylus tends to be worn away. This results in the twofold problem of record wear and stylus wear. Various solutions to alleviate these problems present themselves. In the first instance, quality components are designed to minimize the force with which the stylus tracks the record. However, if too little force is applied, the tendency of the stylus is to leave the groove and "skate" across the record. Another solution to the wear problem is to increase the area of the stylus which contacts the groove thereby reducing the force per unit area which the stylus exerts against the record. This, however, is particularly difficult to accomplish because of the minute dimensions involved particularly in the case of quadrasonic records where the extended frequency range dictates that the variations in the record grooves be more closely spaced along the length of the groove than with conventional stereophonic or monaural discs.

In view of the above, it is the principal object of the present invention to provide an improved phonograph record stylus adapted to accurately and faithfully track the signals recorded on the walls of a record groove including discrete four channel records.

A further object is to provide a stylus having improved wear characteristics so as to minimize the wear of the stylus and associated record during use.

SUMMARY OF THE INVENTION

The above and other beneficial objects and advantages are attained in accordance with the present invention by providing a phonograph stylus for use with a transducer for transposing mechanical variations on the opposed walls of the grooves of a record disc into electrical signals. The stylus comprises an elongated body member having a mounting portion at one end and an active portion tapering to a tip opposite the mounting portion. The active portion is defined by four intersecting convex faces. Two of the faces intersect to form a first curved edge which abuts one of the walls over a major portion of the length of the edge and the remaining two of the faces intersect to form a second curved edge which abuts the other of the walls over a major portion of the length of the edge. The first and second curves intersect at the tip of the stylus and are 180° apart from each other about the jewel body.

BRIEF DESCRIPTION OF THE DRAWINGS

In the accompanying drawings, all of which are greatly enlarged.

DETAILED DESCRIPTION OF THE PREFERRED EMBODIMENT

Figures 1, 2, 3:
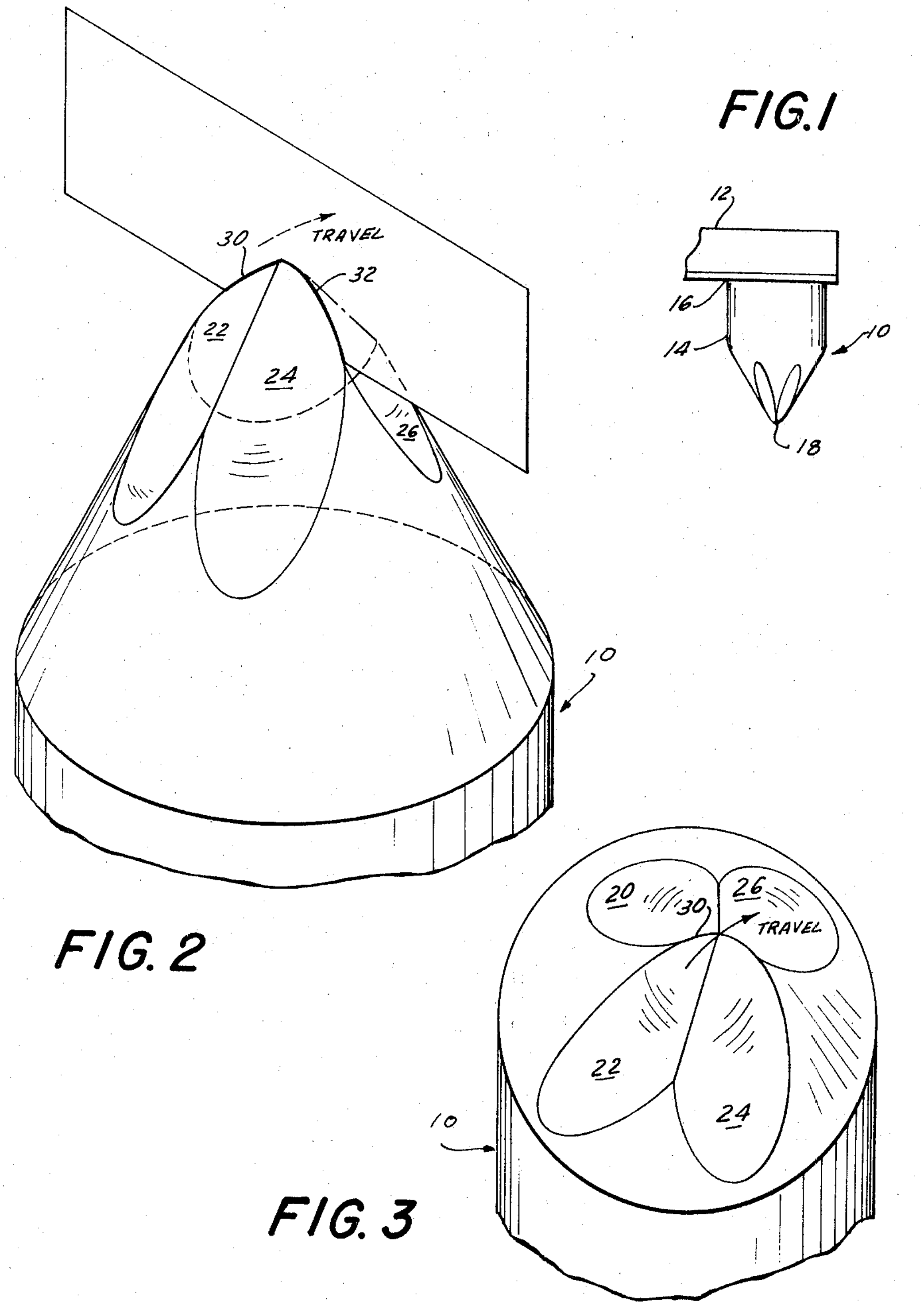
FIG. 1 is a fragmentary side elevational view of the stylus of the present invention mounted to the armature of an associated cartridge.
FIG. 2 is a fragmentary perspective view of the present stylus depicted with a referencing plane to facilitate orientation.
FIG. 3 is another perspective view looking down at the stylus tip.

Reference is now made to the drawings and in particular to FIG. 1 wherein the stylus 10 of the present invention is shown mounted to an armature 12 for use in an associated phonograph cartridge. The stylus may be formed of any suitably hard material and normally comprises a jewel such as a diamond or saphire. The stylus is bonded to the armature by an epoxy or the like in accordance with procedures well known and defined in the art. As stated, the stylus serves to track the signal recorded on a record disc. The bonded armature follows the stylus and in so doing, interrupts an electrical or magnetic field thereby generating a signal representative of movement of the stylus.

As shown, the stylus comprises an elongated body 14 having a mounting portion 16 at the end to be bonded to the armature and terminating in a tip 18 opposite the bonding end. Extending from the tip 18 toward the mounting end there is defined an active portion of the stylus, that is the portion of the stylus that actually enters the record groove and includes the surfaces of the stylus that contact the walls of the groove. Since the depth of a record groove is on the order of 0.002 inch, the active portion is generally of the same order of magnitude.

Figure 4:
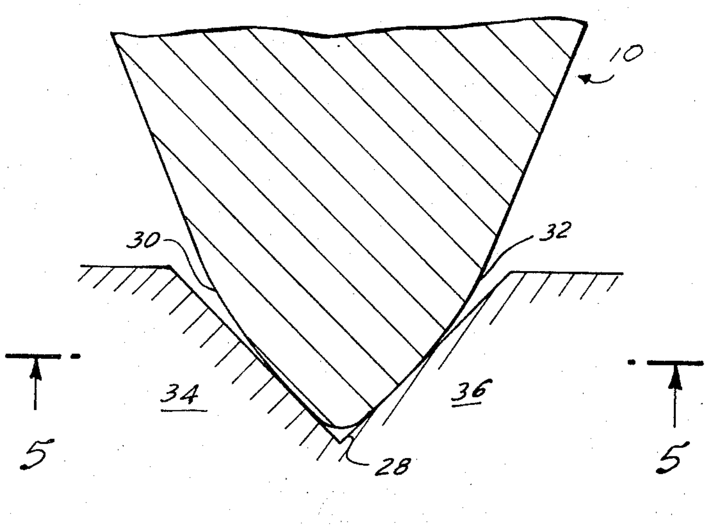
FIG. 4 is a sectional view taken along the referencing plane of FIG. 2 but showing the stylus in the groove of a record; and, FIG. 5 is a sectional view taken along reference lines 5—5 of FIG. 4 in the indicated direction.
Figure 5:
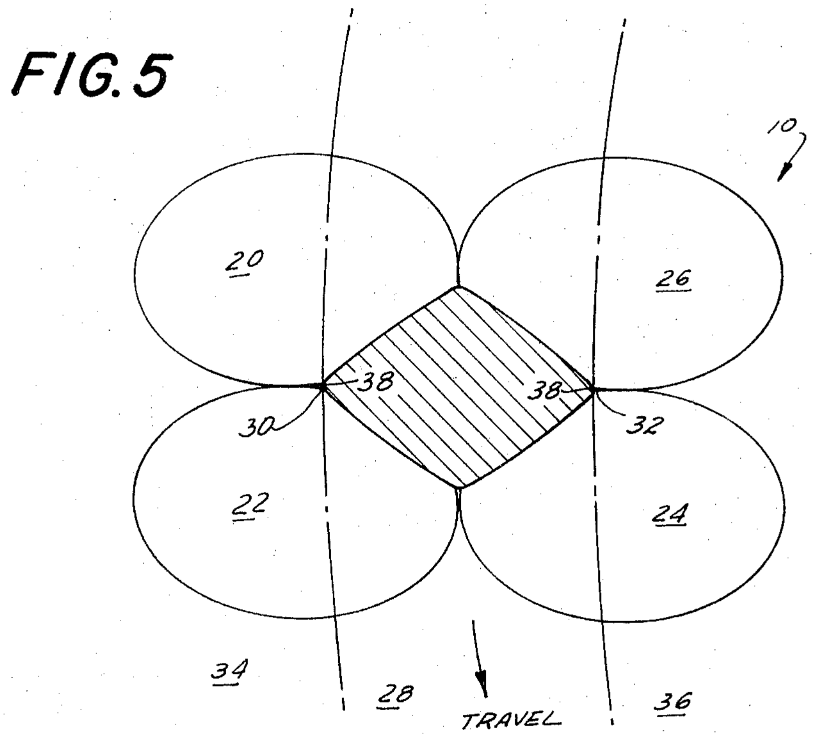

The active portion of the stylus up to and including the tip is formed by the intersection of four convex curved faces 20, 22, 24 and 26 seen most clearly in FIG. 3. The four faces are so disposed as to define a generally parallelogram-shaped figure in a section through the active portion perpendicular to the longitudinal axis as shown in FIG. 5. Thus, while the surfaces are curved, opposite angles are equal to each other and adjacent angles are supplementary. As also shown in FIGS. 4 and 5, the stylus 10 makes contact with the walls of the record groove 28 only along opposite edges 30 and 32 of the major axis of the parallelogram, which are 180° apart from each other about the body portion. As shown, wall 34 of the record groove is contacted by stylus edge 30 and wall 36 is contacted by stylus edge 32.

Referring to FIGS. 2 and 3, it can be seen that edge 30 is defined by the intersection of curved faces 20 and 22. Similarly, edge 32 is defined by the intersection of curved faces 24 and 26. These edges are, in fact, curved lines, the curvature of which is determined by that of the associated intersecting curved faces. In other words, the curvature of edge 30 is governed by the curvature of the intersecting convex faces 20 and 22 and the curvature edge 32 is governed by the curvature of convex faces 24 and 26.

As previously mentioned, in order to reduce record and stylus wear, it is desirable to reduce the stress of the stylus on the record walls by increasing the contact area of the stylus and wall. This cannot be done in the direction of the length of the record groove without hampering the ability of the stylus to reproduce the recorded signal and, accordingly, must be done along an axis transverse to the groove. Accordingly, as shown in FIG. 4, this is accomplished by having edges 30 and 32 extend tangentially to abut the groove walls over a major portion of the active portion as shown in FIG. 4. In this connection, the groove walls of record discs are disposed perpendicular to each other at 45° angles to the plane of the record. Thus, edge 30 is substantially tangential to record groove wall 34 over a large portion of its length and similarly, edge 32 is substantially tangential to wall 36. As stated, this is accomplished by choosing the convex curvature and angles of faces 20, 22, 24 and 26 so that edges 30 and 32 have the desired curvature. Edges 30 and 32 formed by the intersection of the curved faces are substantial knife edges which can accurately track minute variations in the groove walls. However, the knife edges will cause rapid wear and, accordingly, it is desirable to round off the edges slightly such as by applying a 0.0002 inch radius 38 on the contact edges.

Thus, in summary, the invention provides a new and improved stylus wherein the active portion of the stylus is defined by the intersection of four convex faces the curvature and angles of which are chosen so that both of two opposite intersecting edges define curves tangent to the walls of an associated record groove over a major portion of their length. In a successful practice of the invention where the convex faces tapered to a tip and the active portion of the stylus was approximately 0.001 inch, the radius of each of the convex faces was approximately 0.003 inch, the acute angle between adjacent faces 20–22 and 26–24 was 70° and the obtuse angle between adjacent faces 22–24 and 20–26 was 110°.

Having thus described the invention, what is claimed is:

1. A phonograph stylus for use with a transducer for transposing mechanical variations on the opposed walls of the grooves of a phonograph record into electrical signals comprising: an elongated body portion having a mounting portion at one end and an active portion tapering to a tip opposite said one end, said tip being defined by the intersection of four convex faces, wherein two of said faces intersect to form a first curved edge which when engaged with a record is substantially tangent to one of the walls of said groove over a major portion of its length and the remaining two of said faces intersect to form a second curved edge substantially tangent to the other of the walls of said groove over a major portion of its length.

2. The phonograph stylus in accordance with claim 1 wherein said first curved edge and second curved edge are 180° apart about said body portion and meet at said tip.

3. The phonograph stylus in accordance with claim 1 wherein said active portion is generally parallelogram-shaped in section perpendicular to the longitudinal axis of said body, said convex faces define the sides of said parallelogram, and said first and second curved edges are disposed at opposite ends of a major axis of said parallelogram.

4. The phonograph stylus in accordance with claim 1 wherein said first and second curved edges are rounded off.

* * * * *